(12) United States Patent
Pleiss

(10) Patent No.: US 6,867,940 B2
(45) Date of Patent: Mar. 15, 2005

(54) METHOD AND APPARATUS FOR MITIGATING THERMAL POLE TIP PROTRUSION

(75) Inventor: Curtis Michael Pleiss, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 102 days.

(21) Appl. No.: 10/462,242

(22) Filed: Jun. 16, 2003

(65) Prior Publication Data
US 2004/0252396 A1 Dec. 16, 2004

(51) Int. Cl.⁷ .............................................. G11B 5/02
(52) U.S. Cl. .......................................... 360/59; 360/68
(58) Field of Search ........................... 360/59, 68, 60, 360/124, 123; 369/13.01, 13.14, 13.15, 13.22, 13.23

(56) References Cited

U.S. PATENT DOCUMENTS

| 5,164,869 A | 11/1992 | Fontana, Jr. et al. |
| 6,074,566 A | 6/2000 | Hsiao et al. |
| 6,181,514 B1 | 1/2001 | Santini et al. |
| 6,330,128 B1 | 12/2001 | Chang et al. |
| 6,349,014 B1 | 2/2002 | Crue, Jr. et al. |
| 6,396,660 B1 | 5/2002 | Jensen et al. |
| 6,466,404 B1 | 10/2002 | Crue, Jr. et al. |
| 6,473,258 B1 * | 10/2002 | Shitara et al. ................. 360/67 |

* cited by examiner

Primary Examiner—Alan T. Faber
(74) Attorney, Agent, or Firm—Westman, Champlin & Kelly, P.A.

(57) ABSTRACT

A method of operating a transducer includes heating a write element by passing a preheat electrical current through a conductive coil of the write element in a manner which produces a substantially zero magnetic flux. The method also includes writing data to a media after heating the write element by passing a write electrical current through the conductive coil in a manner in which produces a net magnetic flux.

20 Claims, 6 Drawing Sheets

METHOD AND APPARATUS FOR MITIGATING THERMAL POLE TIP PROTRUSION

FIELD OF THE INVENTION

The present invention relates generally to data storage systems. In particular, the present invention relates to a read/write head in a data storage system to read data from, and write data to, a magnetic recording medium.

BACKGROUND OF THE INVENTION

Disc drives are common data storage devices. A typical disc drive includes a rigid housing that encloses a variety of disc drive components. The components include one or more rotating discs having data surfaces that are coated with a medium for storage of digital information in a plurality of circular, concentric data tracks. The discs are mounted on a spindle motor that causes the discs to spin and the data surfaces of the discs to pass under respective aerodynamic bearing disc head sliders. The read/write heads carry transducers, which write information to and read information from the data surfaces of the discs.

Typically, the read/write head includes an inductive recording or write element for generating a magnetic field that aligns the magnetic moments of the data surfaces to represent desired bits of data. The write element includes a magnetic core having a write gap to record magnetic transitions in the magnetized medium surface of a disc. The core is magnetically coupled to a conductive coil. Electrical current flows through the conductive coil during write operation and generates magnetic flux in the core to record transitions in the magnetic surface coating of the rotating disc or other medium. The magnetic core includes a main pole and a return pole, wherein each pole has a corresponding pole tip adjacent a surface opposing the storage medium. In a write head, for example, the pole tips are positioned on an air-bearing surface (ABS) of the slider. The distance between the main pole tip and the return pole tip is the write gap or gap length.

The read head includes a magnetoresistive read sensor that is adapted to read magnetic flux transitions recorded to data tracks on the medium which represent the bits of data. The magnetic flux from the recording medium causes a change in the electrical resistivity of the read element, which can be detected by passing a sense current through the read element and measuring a voltage across the read element. The voltage measurement can then be decoded to determine the recorded data.

With the continuing need to meet the never ending demands for higher disc drive storage capacity, the read/write head to media nominal spacing has been decreasing to pursue greater areal densities. Thermal pole tip protrusion can be a significant percentage of the total nominal spacing between the head and disc. Thus, pole tip protrusion can effect the write performance of the disc drive. For example, the plurality of circular, concentric data tracks on the magnetic medium is divided into data sectors. As electrical current initially conducts through the conductive coil during write operation, the core is heated. The heating of the core results in thermal expansion of the pole tips. As a result of thermal expansion, the pole tips begin to protrude and push the write element closer to the surface of the disc, which, when thermally stabilized, result in a more efficient write process. However, there is less pole tip protrusion while the first few data sectors are written than in later data sectors when the temperature of the write element has stabilized. The problem may be exacerbated in a low temperature ambient environment because colder ambient temperatures cause the pole tips to recess away from the disc such that the head to media spacing is even greater in the first few data sectors.

SUMMARY OF THE INVENTION

The present invention is directed towards a method of operating a transducer. The method includes heating a write element by passing a preheat electrical current through a conductive coil of the write element in a manner which produces a substantially zero net magnetic flux. The method also includes writing data to a media after heating the write element, by passing a write electrical current through the conductive coil in a manner in which produces a net magnetic flux.

Other features and benefits that characterize embodiments of the present invention will be apparent upon reading the following detailed description and review of the associated drawings.

BRIEF DESCRIPTION OF THE DRAWINGS

FIG. 3-1 is a schematic diagram of a write element in accordance with the prior art.

FIG. 3-2 is a schematic diagram of a write element in accordance with an embodiment of the present invention.

FIG. 4-1 is schematic diagram of a current control system in accordance with an embodiment of the present invention.

FIG. 4-2 is a schematic diagram of a current control system after a write element has thermally stabilized in accordance with an embodiment of the present invention.

FIG. 5-1 is a schematic diagram of a current control system in accordance with an embodiment of the present invention.

FIG. 5-2 is a schematic diagram of a current control system after a write element has thermally stabilized in accordance with an embodiment of the present invention.

DETAILED DESCRIPTION OF ILLUSTRATIVE EMBODIMENTS

Figure 1:
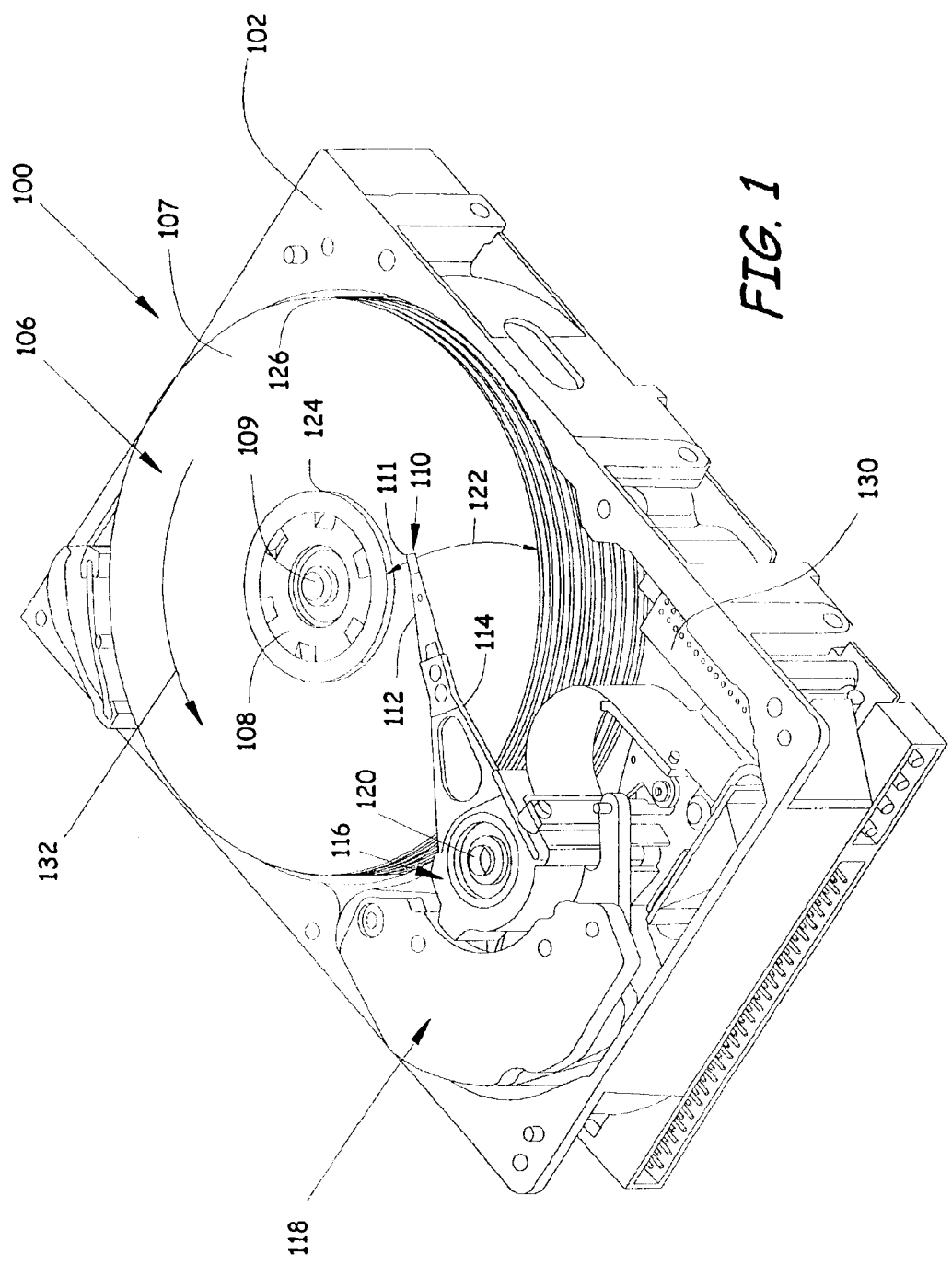
FIG. 1 is a perspective view of a data storage system.

FIG. 1 is a perspective view of disc drive 100 that includes a housing with base deck 102 and top cover (not shown) in which embodiments of the present invention are useful. Disc drives are common data storage systems. Disc drive 100 further includes a disc pack 106, which is mounted on a spindle motor (not shown) by a disc clamp 108. Disc pack 106 can include one or more discs and is illustrated with a plurality of individual discs 107, which are mounted for co-rotation about axis 109 in the direction indicated by arrow 132. Each disc surface has an associated slider 110 that carries a read/write head 111 for communication with a disc surface. In the example in FIG. 1, slider 110 is supported by suspension 112 that is in turn attached to track accessing arm 114 of an actuator mechanism 116. Actuator mechanism 116 is of the type known as a rotating moving coil actuator and includes a voice coil motor (VCM), shown generally at 118. VCM 118 rotates actuator 116 about pivot shaft 120 to position slider 110 over a desired data track along an arcuate path 122 between a disc inner diameter 124 and a disc outer diameter 126. Slider 110 is coupled to suspension 112 through a gimbal attachment which allows slider 110 to pitch and roll as it rides on an air-bearing surface (ABS) of disc 107. Slider 110 supports a head 111 at a trailing portion. Head 111 includes separate reading and writing elements for reading data from, and recording data to disc 107.

During operation, as disc 107 rotates, air is dragged under the ABS of slider 110 in a direction approximately parallel to the tangential velocity of disc 107. As the air passes beneath the bearing surfaces, air compression along the air flow path causes the air pressure between the disc surface and the bearing surfaces to increase, which creates a hydrodynamic lifting force that counteracts a load force provided by suspension 112. This hydrodynamic lifting force causes the slider 110 to "fly" above, and in close proximity, to the disc surface of disc 107.

VCM 118 is driven by electronic circuitry 130 based on signals generated by head 111 and a host computer (not shown). During operation, electronic circuitry 130 receives position information indicating a portion of disc 107 to be accessed. Electronic circuitry 130 receives the position information from an operator, from a host computer, or from another suitable controller. Based on the position information, electronic circuitry 130 provides a position signal to actuator mechanism 116. Once head 111 is appropriately positioned over a specified track on disc 107, electronic circuitry 130 then executes a desired read or write operation.

Figure 2:
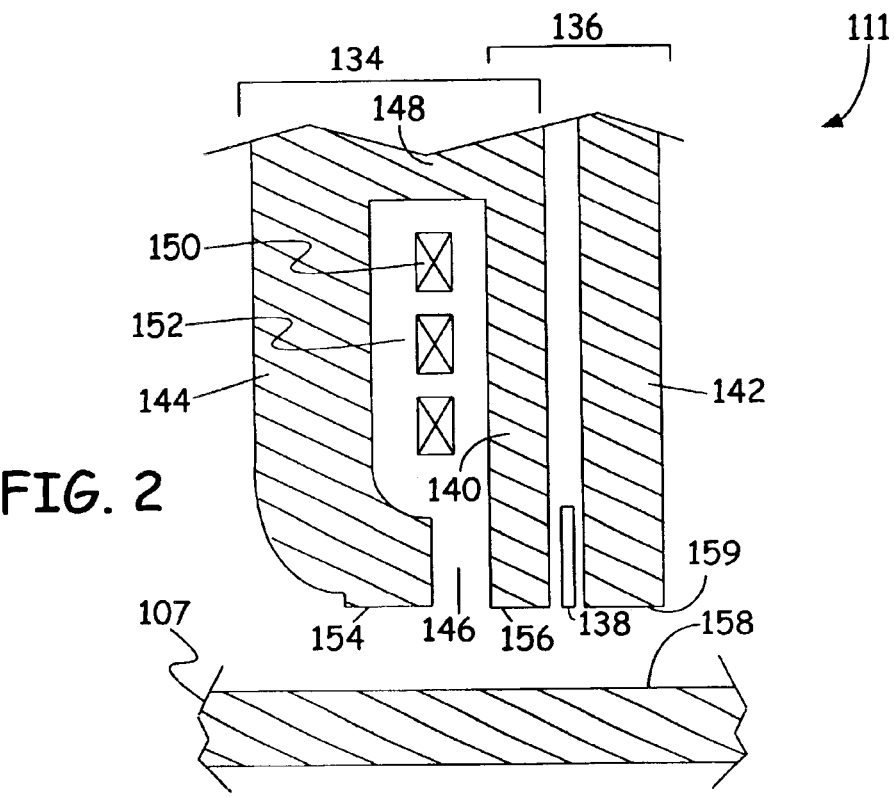
FIG. 2 is a cross sectional view of a read/write head.

A side cross-sectional view of a portion of read/write head 111 and disc 107 is shown in FIG. 2 in which embodiments of the present invention are useful. Read/write head 111 includes a writing element 134 and a reading element 136. Reading element 136 of head 111 includes a read sensor 138 that is spaced between a return pole 140, which operates as a top shield, and a bottom shield 142. The top and bottom shields operate to isolate the reading element from external magnetic fields that could affect sensing bits of data that have not been recorded on disc 107.

Writing element 134 includes a writing main pole 144 and return pole 140. The main and return poles 144 and 140 are separated by a write gap 146. Main pole 144 and return pole 140 are connected at back gap 148. A conductive coil 150 extends between main pole 144 and return pole 140 and around back gap 148. An insulating material 152 electrically insulates conductive coil 150 from main and return poles 144 and 140. Main and return poles 144 and 140 include main and return pole tips 154 and 156, respectively, which face disc surface 158 and form a portion of the ABS 159.

Figures 1, 3:
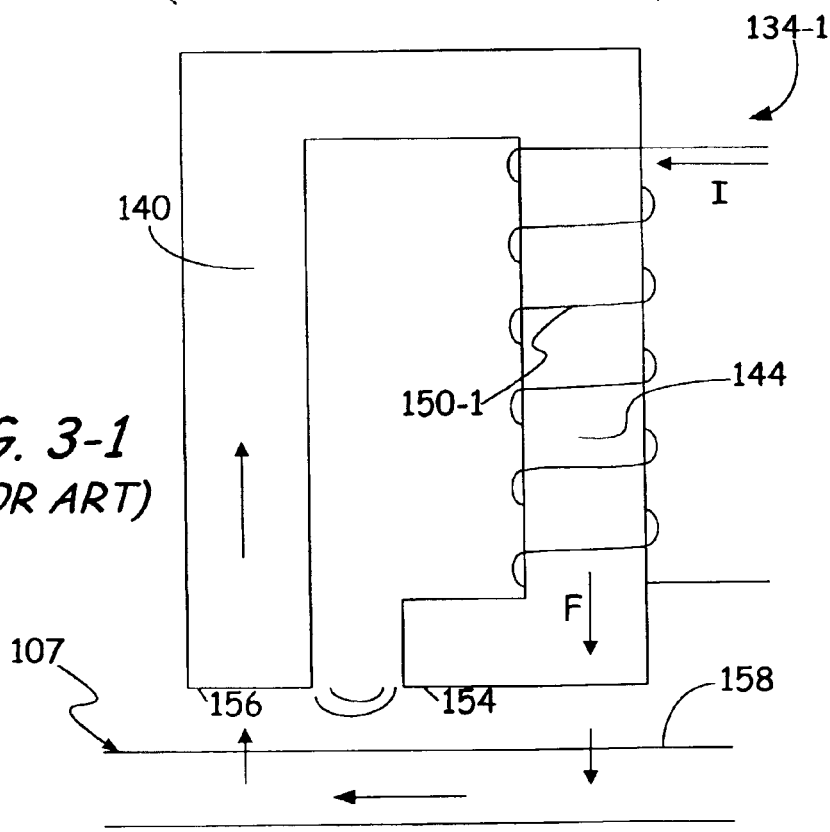
Figures 2, 3:
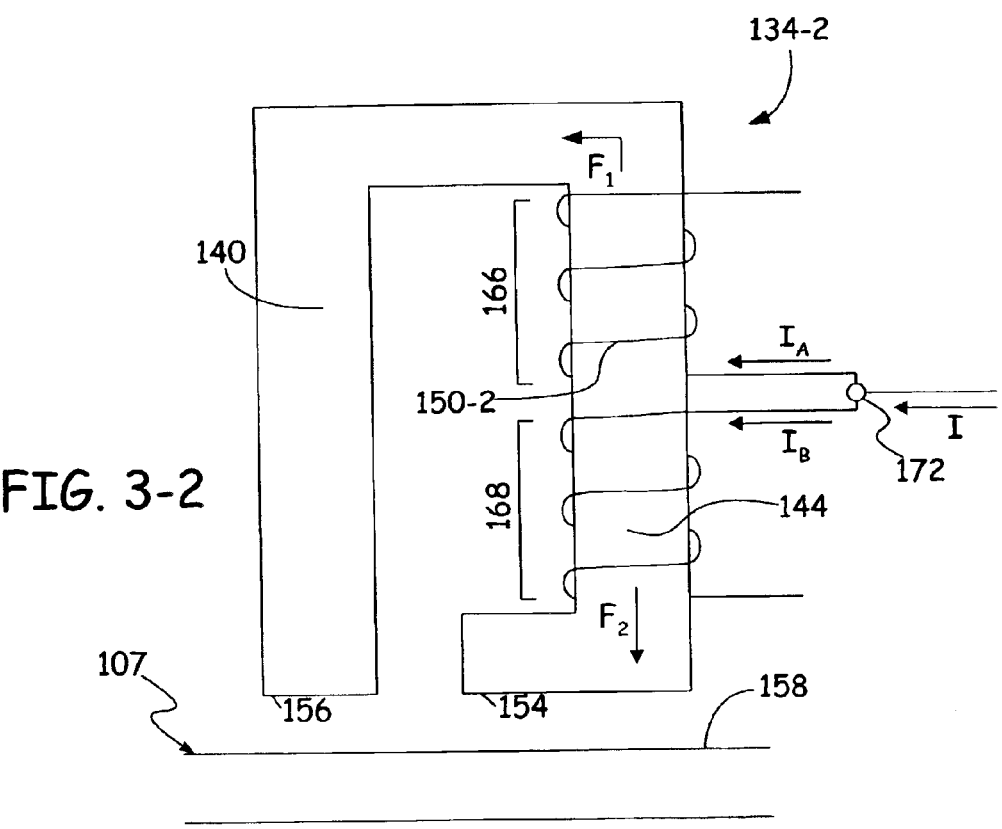

FIG. 3-1 illustrates a simplified diagram of writing element 134-1 in accordance with the prior art. A magnetic circuit is formed in writing element 134 by main and return poles 144 and 140 and the storage media of disc 107. During write operation, an electrical current I is directed to conduct through conductive coil 150-1. Current I induces magnetic flux F that is conducted through the magnetic circuit. The magnetic circuit allows the magnetic flux F to travel vertically through the main pole tip 154, the storage media of disc 107 and through return pole tip 156 of return pole 140. One skilled in the art should realize that the above-described write process can be applied to longitudinal recording as well as perpendicular recording.

In disc drives, such as disc drive 100 of FIG. 1, thermal pole tip protrusion can be a significant percentage of the total nominal spacing between head 111 and disc surface 158 in disc drives that have great areal densities. As electrical current I conducts through conductive coil 150-1 during write operation, the write element 134-1 is heated. The heating of write element 134-1 results in thermal expansion of the pole tips 154 and 156. As a result of thermal expansion, the pole tips 154 and 156 protrude and push write element 134-1 closer to disc 107, which, when thermally stabilized, result in a more efficient write process. However, there is less pole tip protrusion while the first few data sectors of disc 107 are written than in later data sectors when the temperature of write element 134-1 has stabilized. Thus, thermal pole tip protrusion can detrimentally effect the write performance of the disc drive. To prevent data errors written to disc 107 during pole tip protrusion, the present invention preheats conductive coil 150-1 to allow write element 134-1 to thermally stabilize prior to writing data to the disc surface 158.

FIG. 3-2 illustrates a simplified diagram of write element 134-2 in accordance with an embodiment of the present invention. Write element 134-2 is configured for incorporation into a read/write head of a data storage system, such as read/write head 111 of data storage system 100 in FIG. 1. To eliminate and prevent errors written to disc 107 during pole tip protrusion and prior to thermal stabilization, electrical current I is configured to generate a substantially zero net magnetic flux. The generation of the zero net magnetic flux prevents write element 134-2 from writing to the disc 107 while current is conducted through conductive coil 150-2. With current conducting through conductive coil 150-2, write element 134-2 is heated, which results in thermal expansion of the pole tips 154 and 156. After thermal stabilization in write element 134-2, electrical current I is configured to generate a net magnetic flux. The generation of the net magnetic flux allows write element 134-2 to write data to disc 107. Thus, errors written to disc 107 during pole tip protrusion and prior to thermal stabilization are eliminated.

To generate the substantially zero net magnetic flux, write element 134-2 includes center tap 172 that equally divides conductive coil 150-2 into a first coil section 166 and a second coil section 168. Electrical current I is applied to conductive coil 150-2 and center-tap 172. Electrical current I is equally divided into first current $I_A$ and second current $I_B$. First current $I_A$ is conducted through first coil section 166. Second current $I_B$ is conducted through second coil section 168. Current $I_A$ and current $I_B$ have an equal but directionally opposite magnitude. As a result of the equal yet directionally opposite currents $I_A$ and $I_B$, magnetic fluxes $F_1$ and $F_2$ are generated, respectively, which have equal yet directionally opposite magnitudes and produce the zero net magnetic flux.

Figures 1, 4:
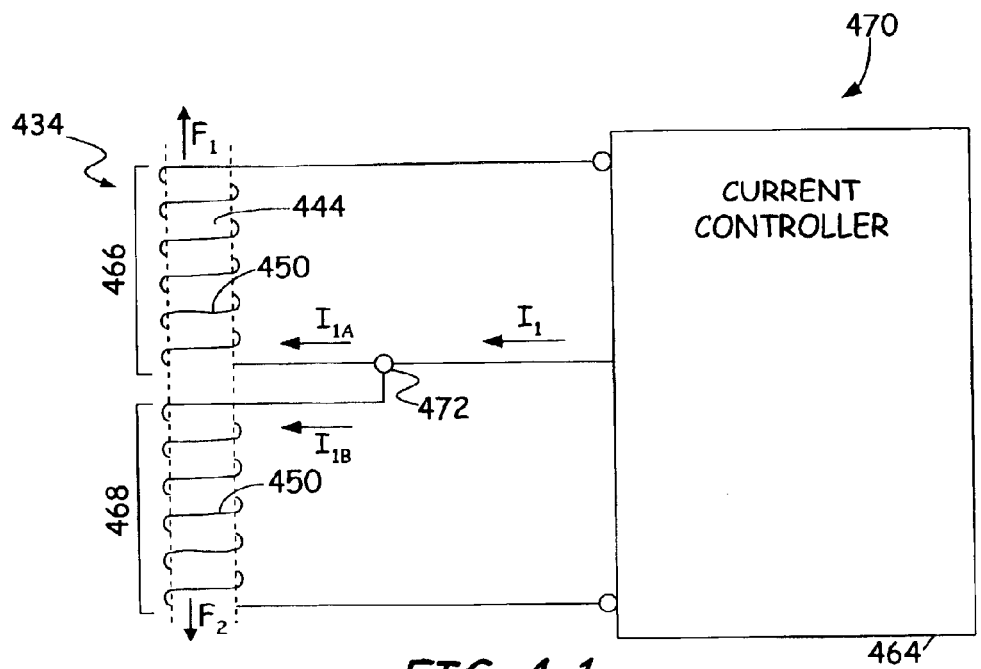
Figures 2, 4:
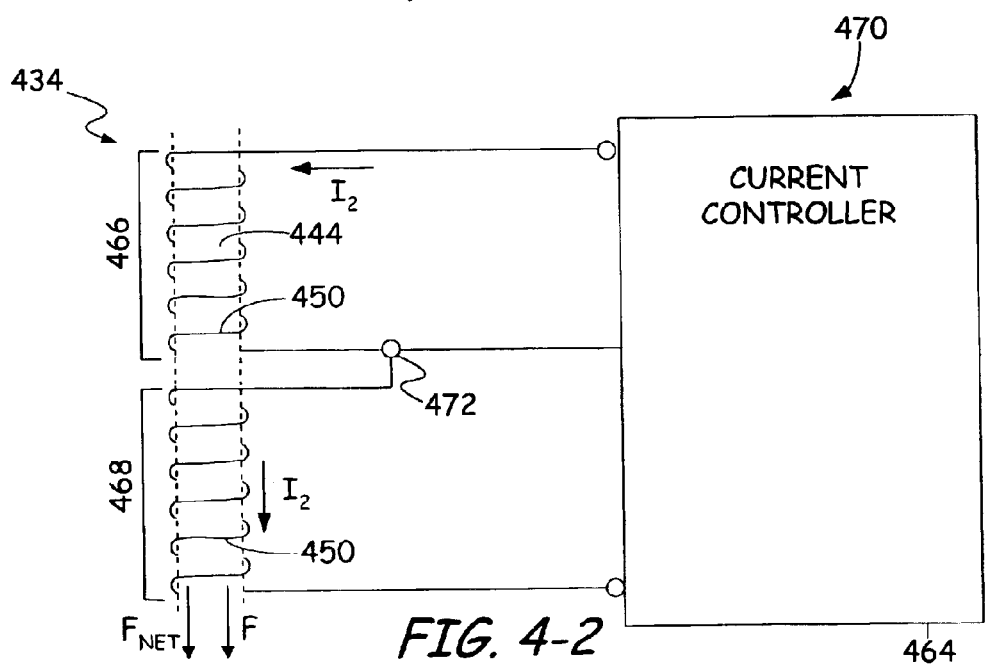

In one aspect of the present invention, FIG. 4-1 is a schematic illustration of current control system 470 in accordance with an embodiment of the present invention. Current controller 464 forms a current control system 470 with conductive coil 450 and a portion of main pole 444 of write element 434. For example, write element 434 and the portion of main pole 444 can be substituted for write element 134 and main pole 144 of FIG. 2 and FIG. 3-2. Current controller 464 is configured to apply preheat electrical current $I_1$ to center-tap 472 of conductive coil 450. Current controller 464 equally divides preheat electrical current $I_1$ into first preheat electrical current $I_{1A}$ and second preheat electrical current $I_{1B}$. First preheat electrical current $I_{1A}$ is conducted through first coil section 466. Second preheat electrical current $I_{1B}$ is conducted through second coil section 468. Current $I_{1A}$ and current $I_{1B}$ have an equal but directionally opposite magnitude.

First preheat electrical current $I_{1A}$ induces a first magnetic flux $F_1$ and second preheat electrical current $I_{1B}$ induces second magnetic flux $F_2$. First magnetic flux $F_1$ has an equal but directionally opposite magnitude from second magnetic flux $F_2$. For example, to create an equal magnitude in flux $F_1$ and flux $F_2$, first coil section 466 and second coil section 468 have equal coil turns, equal resistance and equal geometry. Flux $F_1$ and flux $F_2$ induce a substantially zero net magnetic flux in write element 434. The substantially zero net magnetic flux induced in write element 434 prevents the medium, such as disc 107 of FIG. 1, FIG. 2 and FIG. 3-2 from completing a magnetic circuit and being recorded. For example, the magnetic circuit can be the magnetic circuit described in FIG. 3-1. Conductive coil 450 resists current $I_{1A}$ and $I_{1B}$. Thus, conductive coil 450 is heated and pole tips 154 and 156 of FIGS. 2 and 3-2 protrude and push write element 434 closer to the surface of disc 107 without data written to the media.

Write element 434 takes a short period of time to thermally stabilize. For example, write element 434 can be stabilized within, but not limited by, 10 to 1000 microseconds. In accordance with an embodiment of the present invention, FIG. 4-2 is a schematic illustration of current control system 470 after write element 434 has thermally stabilized. For example, write element 434 can be substituted for write element 134 in FIG. 2 and FIG. 3-2. In FIG. 4-2, current controller 464 passes write electrical current $I_2$ through the entire conductive coil 450. For example, by open circuiting center-tap 472, current controller 464 can pass write electrical current $I_2$ through first coil section 466 and second coil section 468 in the same direction. Write electrical current $I_2$ conducted through conductive coil 450 induces a net magnetic flux $F_{NET}$. Net magnetic flux $F_{NET}$ completes the magnetic circuit and allows write element 434 to write data to disc 107. For example, the magnetic circuit can be the magnetic circuit described in FIG. 3-1.

Figures 1, 5:
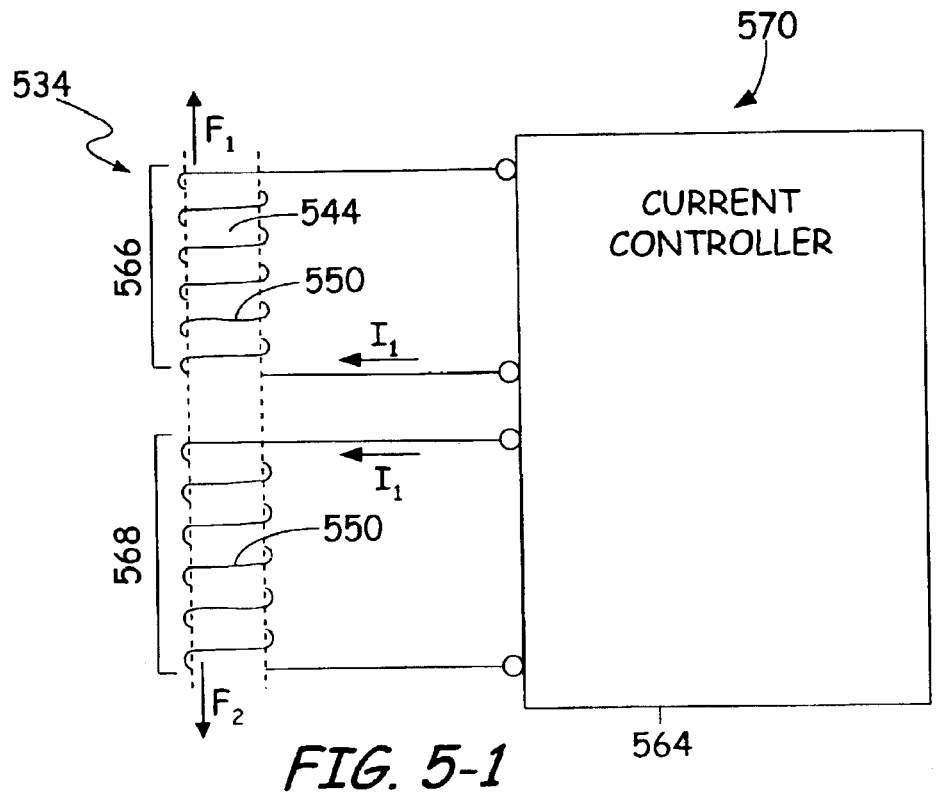
Figures 2, 5:
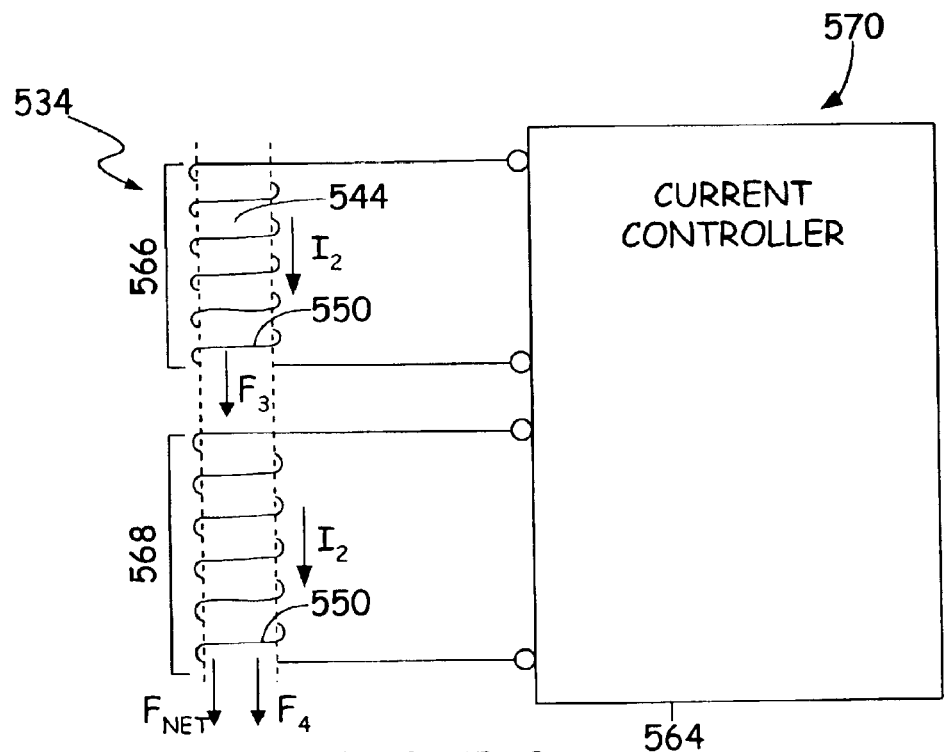

In another aspect of the present invention, FIG. 5-1 illustrates a schematic diagram of current control system 570 in accordance with an embodiment of the present invention. Current controller 564 forms a current control system 570 with conductive coil 550 and a portion of main pole 544 of write element 534. For example, write element 534 and the portion of main pole 544 can be substituted for write element 134, 134-1 and main pole 144 of FIG. 2 and FIG. 3-2. Current controller 564 conducts a first portion of preheat electrical current $I_1$ through first coil section 566 of conductive coil 550. Current controller 564 also conducts a second portion of preheat electrical current $I_1$ through second coil section 568. The first portion of preheat current $I_1$ in first coil section 566 and the second portion of preheat electrical current $I_1$ in coil section 568 have an equal but directionally opposite magnitudes.

The first portion of preheat electrical current $I_1$ in first coil section 566 induces first magnetic flux $F_1$ and the second portion of preheat electrical current $I_1$ in second coil section 568 induces second magnetic flux $F_2$. First magnetic flux $F_1$ is in an equal but directionally opposite magnitude from second magnetic flux $F_2$. For example, to create an equal magnitude in flux $F_1$ and flux $F_2$, first section 566 and second section 568 have equal coil turns, equal resistance and equal geometry. Flux $F_1$ and flux $F_2$ induce a substantially zero net magnetic flux in write element 534. The substantially zero net magnetic flux developed in write element 534 prevents the formation of a magnetic circuit and disc 107 from being recorded. For example, the magnetic circuit can be the magnetic circuit described in FIG. 3-1. Conductive coil 550 resists preheat electrical current $I_1$ in first coil section 566 and preheat electrical current $I_1$ in second coil section 568. Thus, conductive coil 550 is heated and pole tips 154 and 156 of FIGS. 2 and 3 thermally protrude and push write element 534 closer to the surface 158 of disc 107 without writing data to the storage media.

Write element 534 takes a short period of time to thermally stabilize. For example, write element 534 can be stabilized within, but not limited by, 10 to 1000 microseconds. In accordance with an embodiment of the present invention, FIG. 5-2 illustrates a schematic diagram of current control system 570 after write element 534 has thermally stabilized. For example, write element 534 can be substituted for write element 134 in FIG. 2. In FIG. 5-2, current controller 564 passes a first portion of write electrical current $I_2$ through first coil section 566 and passes a second portion of write electrical current $I_2$ through second coil section 568 in the same direction. The first portion of write electrical current $I_2$, conducted through first coil section 566 induces a magnetic flux $F_3$. The second portion of write electrical current $I_2$ conducted through second section 568 induces magnetic flux $F_4$. Flux $F_3$ and $F_4$ have an equal magnitude and direction. Therefore, the total amount of flux induced in write element 534 is net magnetic flux $F_{NET}$. Net magnetic flux $F_{NET}$ completes the magnetic circuit and allows write element 534 to write data to disc 107. For example, the magnetic circuit can be the magnetic circuit described in FIG. 3-1.

Generally, current $I_1$ shown in FIGS. 4-1, and 5-1 is a direct current. A direct current will minimize the possibility of generating an unequal first magnetic flux $F_1$ and second magnetic flux $F_2$ in FIG. 4-1 and FIG. 5-1. If first magnetic flux $F_1$ and second magnetic flux $F_2$ are significantly unequal, there is a possibility that data could be written to disc 107. In addition, the magnitude of current $I_1$ in current control systems 470 and 570 is generally a magnitude that is relative to the amount of heating that occurs in current control systems 470 and 570 of FIG. 4-2 and FIG. 5-2.

Figure 6:
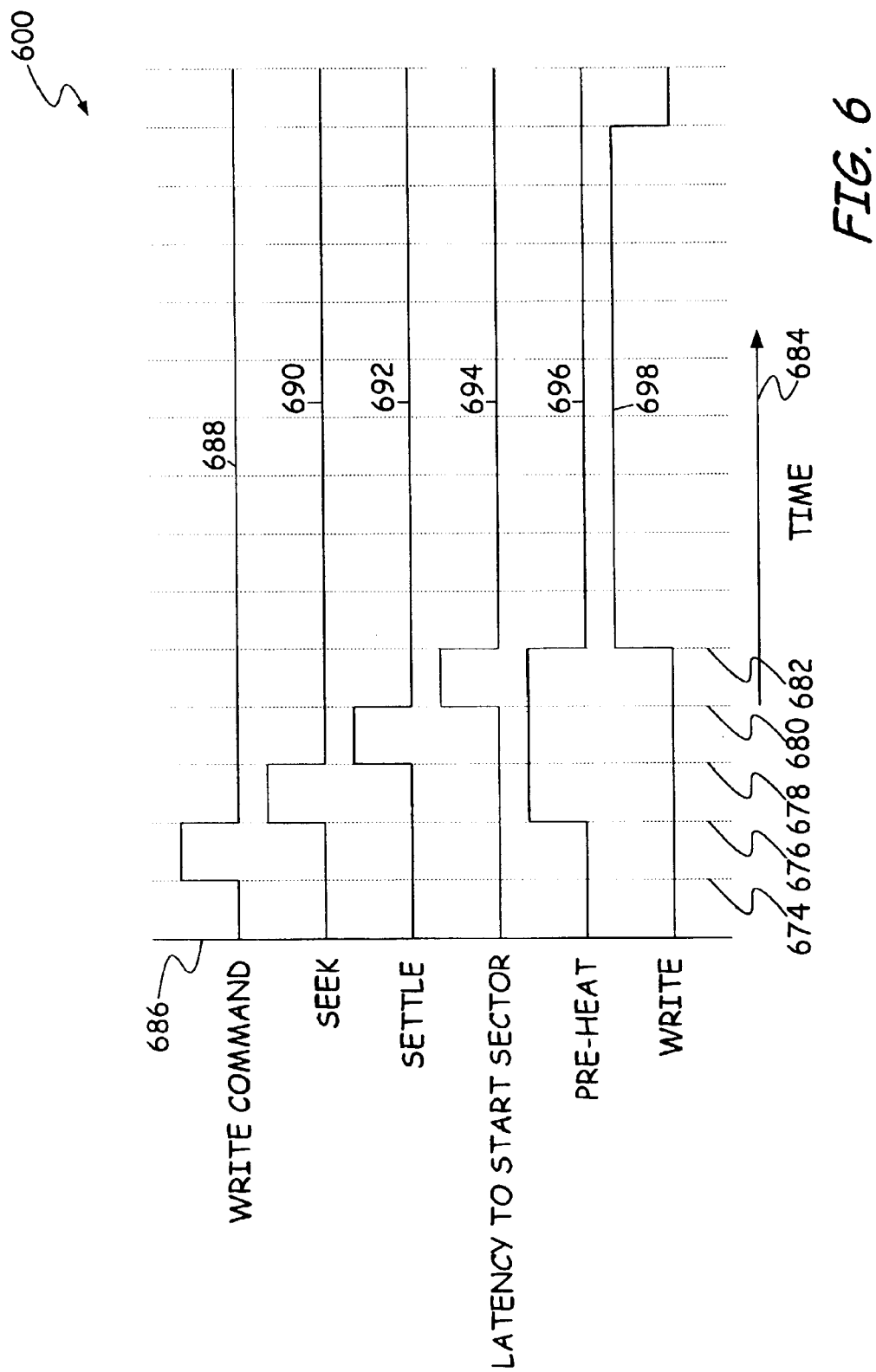
FIG. 6 is a timing diagram in which a preheat current can be implemented in a data storage system.

In yet another aspect of the present invention, FIG. 6 is a timing diagram 600 in which preheat current $I_1$ of FIG. 4-1 and FIG. 5-1 can be implemented in a data storage system by a current controller. For example, the data storage system can be disc drive 100 of FIG. 1 and the current controller can be current controller 464 and 564 of FIG. 4-1 and FIG. 5-1. The time that preheat current $I_1$ is implemented is such that preheating write element 434 and 535 has no impact on data throughput.

Diagram 600 has a time axis 684 and a disc drive operation axis 686. At time 674, write command 688 is issued from a host computer to the electronic circuitry 130 of FIG. 1. The electronic circuitry 130 sends the write command 688 to actuator mechanism 116 with track placement information and sends the write command 688 to read/write head 111. The time to send write command 688 ends at time 676. At time 676, actuator mechanism 116 is in seek mode 690 in order to place slider 110 over the corresponding track which electronic circuitry 130 commanded actuator mechanism 116 to find. Also at time 676, preheat current mode 696 initiates preheat current $I_1$ shown in FIGS. 4-1 and 5-1 to conduct through conductive coil 450 and 550 to heat conductive coil 450 and 550. The time to seek 690 a track on disc 107 ends at time 678. At time 678, preheat current mode 696 continues and preheat current $I_1$ conducts through conductive coil 450 and 550 while actuator mechanism 116 is in settle mode 692 to settle slider 110 over the track on disc 107. Settle mode 692 ends at time 680. At time 680, preheat current mode 696 continues and preheat current $I_1$ conducts through conductive coil 450 and 550 while latency to start sector mode 694 is initiated to find the start of a specific sector for the specific track on disc 107 as instructed by electronic circuitry 130. The latency to start sector mode 694 ends at time 682 along with the preheat current mode 696. At time 682, write current $I_2$ conducts through conductive coil 450 and 550 shown in FIGS. 4-2 and 5-2. Write element 434 and 534 begins to write 698 to disc 107.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular steps and elements may vary depending on the particular application for the disc drive, while maintaining substantially the same functionality without departing from the scope and spirit of the present invention.

What is claimed is:

1. A method of operating a transducer, the transducer having a write element including a conductive coil located between first and second poles, the method comprising:

heating the write element by passing a preheat electrical current through the conductive coil of the write element in a manner which produces a substantially zero net magnetic flux.

2. The method of claim 1 and further comprising writing data to the media after heating the write element by passing a write electrical current through the write coil in a manner which produces a net magnetic flux.

3. The method of claim 1, wherein heating the write element further comprises:

passing the preheat electrical current through a center-tap of the conductive coil of the write element such that the preheat electrical current divides substantially equally into a first preheat current and a second preheat current, with the first preheat current passing through a first coil section of the conductive coil and the second preheat current passing through a second coil section of the conductive coil, and wherein the second preheat current has a substantially equal magnitude and an opposite direction from the first preheat current.

4. The method of claim 3, wherein heating the write element further comprises:

inducing a first magnetic flux in the write element by passing the first preheat current through the first coil section, the first magnetic flux having a magnitude in a first direction; and inducing a second magnetic flux in the write element by passing the second preheat current through the second coil section, the second magnetic flux having the magnitude of the first magnetic flux in a second direction, wherein the second direction is an opposite direction from the first direction such that the substantially zero net magnetic flux results from the induced first magnetic flux and the induced second magnetic flux.

5. The method of claim 1, wherein heating the write element further comprises:

passing a first portion of the preheat electrical current through a first coil section of the conductive coil, the first portion of the preheat electrical current having a magnitude in a first direction; and passing a second portion of the preheat electrical current through a second coil section of the conductive coil, the second portion of the preheat electrical current having the magnitude of the first portion of the preheat electrical current, but in a second direction opposite the first direction.

6. The method of claim 5, wherein heating the write element further comprises:

inducing a first magnetic flux in the write element by passing the first portion of the preheat electrical current through the first coil section, the first magnetic flux having a magnitude in a first direction; and inducing a second magnetic flux in the write element by passing the second portion of the preheat electrical current through the second coil section, the second magnetic flux having the magnitude of the first magnetic flux in a second direction, wherein the second direction is an opposite direction from the first direction such that the substantially zero net magnetic flux results from the induced first magnetic flux and the induced second magnetic flux.

7. The method of claim 2, wherein writing data to the media further comprises passing the write electrical current through a first coil section and a second coil section of the conductive coil to produce the net magnetic flux, the first coil section coupled in series to the second coil section.

8. The method of claim 2, wherein writing data to the media further comprises passing a first portion of the write electrical current through a first coil section of the conductive coil, and passing a second portion of the write electrical current through a second coil section of the conductive coil.

9. The method of claim 8, wherein writing data to the media further comprises producing the net magnetic flux in the write element by combining a first magnetic flux produced by passing the first portion of the write electrical current through the first coil section of the conductive coil with a second magnetic flux produced by passing the second portion of the write electrical current through the second coil section of the conductive coil.

10. A transducer comprising:

a write element comprising:
    a first pole;
    a second pole connected to the first pole;
    a conductive coil located between the first and second poles; and a current controller configured to heat the write element by directing a preheat electrical current through the conductive coil in a manner which produces a substantially zero net magnetic flux in the write element.

11. The transducer of claim 10, wherein the current controller is configured to write a data bit to a data storage media by directing a write electrical current through the conductive coil in a manner which produces a net magnetic flux in the write element.

12. The transducer of claim 11, wherein the preheat and write electrical currents are direct currents.

13. The transducer of claim 10, wherein the conductive coil further comprises:

a center-tap that divides the conductive coil into a first coil section and a second coil section, wherein the current controller is configured to apply the preheat electrical current to the center tap and to thereby equally divide the preheat electrical current into a first preheat electrical current that passes through the first coil section and a second preheat electrical current that passes through the second coil section, wherein the first preheat electrical current is equal in magnitude with and opposite in direction from the second preheat electrical current.

14. The transducer of claim 13, wherein the current controller is configured to control the first and second preheat electrical currents such that a first magnetic flux is induced by the first preheat electrical current, the first magnetic flux having a magnitude in a first direction, and such that a second magnetic flux is induced by the second preheat electrical current, the second magnetic flux having the magnitude of the first magnetic flux in a second direction opposite the first direction to thereby produce the substantially zero net magnetic flux in the write element.

15. The transducer of claim 10, wherein the conductive coil further comprises a first coil section and a second coil section.

16. The transducer of claim 15, wherein the current controller is configured to generate the preheat electrical current such that the preheat electrical current includes a first preheat electrical current and a second preheat electrical current, the current controller being further configured to direct the first and second preheat electrical currents such that the first preheat electrical current passes through the first coil section and the second preheat electrical current passes through the second coil section, wherein the first preheat electrical current is equal in magnitude with and opposite in direction from the second preheat electrical current.

17. The transducer of claim 16, wherein the current controller is configured to control the first and second preheat electrical currents such that a first magnetic flux is induced by the first preheat electrical current, the first magnetic flux having a magnitude in a first direction, and such that a second magnetic flux is induced by the second preheat electrical current, the second magnetic flux having the magnitude of the first magnetic flux in a second direction opposite the first direction to thereby produce the substantially zero net magnetic flux in the write element.

18. The transducer of claim 10, wherein the current controller is configured to heat the write element during seek mode, settle mode and latency to start sector modes of operation.

19. A transducer comprising:
   a write element comprising:
      a first pole;
      a second pole connected to the first pole;
      a conductive coil located between the first and second poles; and
   current control means for heating the write element by directing a preheat electrical current through the conductive coil in a manner which produces a substantially zero net magnetic flux in the write element.

20. The transducer to claim 19, wherein the current control means is configured to write a data bit to a data storage media by directing a write electrical current through the conductive coil in a manner which produces a net magnetic flux in the write element.

* * * * *